US005221025A

United States Patent [19]

Privas

[11] Patent Number: 5,221,025

[45] Date of Patent: Jun. 22, 1993

[54] METHOD AND MECHANICAL, ELECTRICAL, OR ELECTRONIC APPARATUS FOR DISPENSING, ISSUING, OR DIFFUSING MEDICINES, FRAGRANCES OR OTHER LIQUID OR VISOUS SUBSTANCES IN THE LIQUID PHASE OR IN THE GASEOUS PHASE

[75] Inventor: Yves E. Privas, Pompano Beach, Fla.

[73] Assignee: Conceptair Anstalt, Liechtenstein

[21] Appl. No.: 527,810

[22] Filed: May 24, 1990

[30] Foreign Application Priority Data

May 31, 1989 [FR] France ............ 89 07214
Sep. 28, 1989 [FR] France ............ 89 12685

[51] Int. Cl.[5] ............ G01F 11/00

[52] U.S. Cl. ............ 222/1; 222/146.5; 222/333; 222/504; 118/59; 118/317

[58] Field of Search ............ 222/1, 39, 146.5, 190, 222/333, 504, 505, 509, 649; 239/72, 73, 102.2, 102.1, 274; 251/129.01, 129.15, 129.2, ; 392/390, 392, 400; 335/248; 128/200.16; 221/2

[56] References Cited

U.S. PATENT DOCUMENTS

| | | | |
|---|---|---|---|
| 2,795,799 | 6/1957 | Dickerman | 222/505 |
| 2,881,092 | 4/1959 | Sedlacsik, Jr. | 239/102.2 |
| 2,967,643 | 1/1961 | Edelstein et al. | 222/509 |
| 3,127,060 | 3/1964 | Vosbikian et al. | 222/504 |
| 3,195,777 | 7/1965 | Hart | 222/181 |
| 3,203,594 | 8/1965 | Jones | 222/504 |
| 3,255,967 | 3/1964 | Kenney | 239/133 |
| 3,346,189 | 10/1964 | Eisenkraft | 239/102 |
| 3,351,240 | 11/1967 | Gray | 222/504 |
| 3,388,834 | 3/1967 | Hart | 222/70 |
| 3,812,854 | 5/1974 | Michaels et al. | 128/200.16 |
| 3,952,916 | 4/1976 | Phillips | 222/162 |
| 4,025,046 | 5/1977 | Boris | 239/333 |
| 4,031,171 | 6/1977 | Asao et al. | 239/102.2 |
| 4,069,949 | 1/1978 | Ryckman, Jr. | 222/509 |
| 4,184,612 | 1/1980 | Freyre | 222/180 |
| 4,189,098 | 2/1980 | Wagner et al. | 239/127 |
| 4,235,373 | 11/1980 | Clark | 239/70 |
| 4,245,967 | 1/1981 | Busselet | 417/510 |
| 4,334,531 | 6/1982 | Reichl et al. | 239/102.2 |
| 4,415,797 | 11/1983 | Choustolvakis | 392/394 |
| 4,477,789 | 10/1984 | Karlow | 335/248 |
| 4,570,824 | 2/1986 | Bolling | 222/180 |
| 4,579,261 | 4/1986 | Arabian et al. | 222/505 |
| 4,642,165 | 2/1987 | Bier | 222/456 |
| 4,768,176 | 8/1988 | Kehr et al. | 221/2 |
| 4,790,479 | 12/1988 | Matsumoto et al. | 239/102.2 |
| 5,030,253 | 7/1991 | Tokuhiro et al. | 261/DIG. 65 |

FOREIGN PATENT DOCUMENTS

| | | | |
|---|---|---|---|
| 0038598 | 10/1981 | European Pat. Off. . | |
| 0127573 | 12/1984 | European Pat. Off. . | |
| 4011483 | 10/1992 | European Pat. Off. . | |
| 2645661 | 6/1978 | Fed. Rep. of Germany | 239/332 |
| 3518500 | 11/1986 | Fed. Rep. of Germany . | |
| 2252877 | 6/1975 | France . | |
| 2305241 | 10/1976 | France . | |
| 2403465 | 4/1979 | France . | |
| 701809 | 1/1954 | United Kingdom | 222/181 |
| 2099710 | 12/1982 | United Kingdom | 128/200.16 |

*Primary Examiner*—Andres Kashnikow
*Assistant Examiner*—Philippe Derakshani
*Attorney, Agent, or Firm*—Sughrue, Mion, Zinn, Macpeak & Seas

[57] ABSTRACT

A method of dispensing, issuing, or diffusing a liquid (volatile or otherwise) without using a propellant gas, the liquid being a perfume, a cosmetic, an insecticide, or a medicine, for example. The method consists in using a pump type spray head where a liquid is sprayed by being expelled under pressure through a nozzle, and being characterized by the use of a mechanical device during the expulsion stage for obtaining an instantaneous pressure which causes a dose or a spray to be delivered comparable to an aerosol of the type obtained when using a compressed or liquefied propellant gas i.e. an aerosol in which the particles of divided liquid are not greater than 45 microns in size in the liquid phase, and are less than 1 micron in the gas phase, after spraying has occurred, and without spoiling the sprayed substances. The invention also relates to an exclusive or protective system which is personalized by encoding-decoding means that may be mechanical, electronic, or both, assisted by means of an audio-electronic speech synthesis system.

27 Claims, 6 Drawing Sheets

FIG. 7
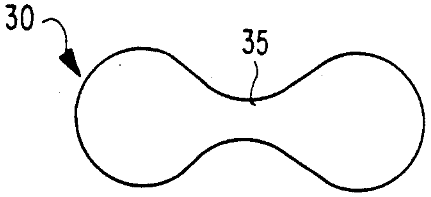
FIG. 8
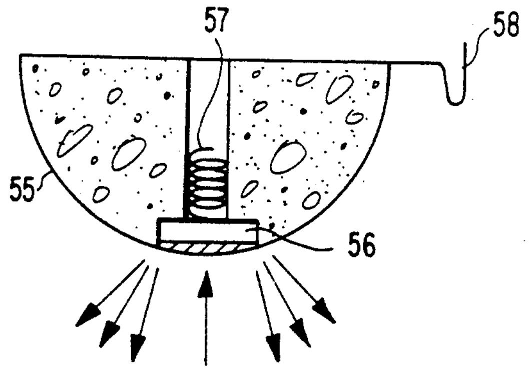
FIG. 10
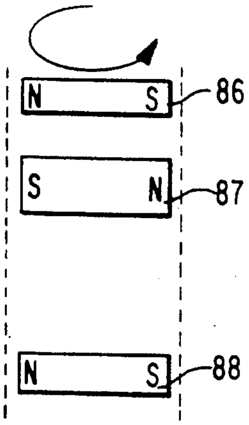
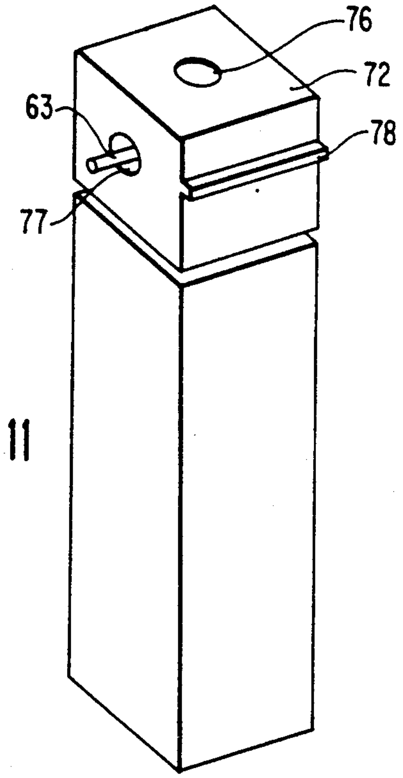
FIG. 11
FIG. 12
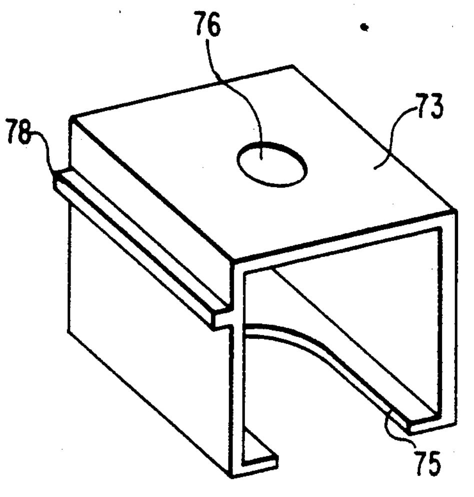
FIG. 13
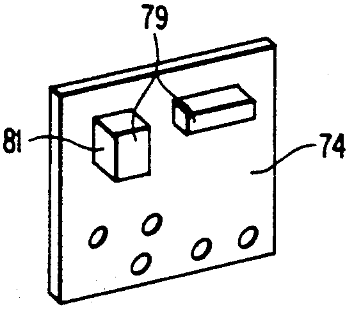

METHOD AND MECHANICAL, ELECTRICAL, OR ELECTRONIC APPARATUS FOR DISPENSING, ISSUING, OR DIFFUSING MEDICINES, FRAGRANCES OR OTHER LIQUID OR VISOUS SUBSTANCES IN THE LIQUID PHASE OR IN THE GASEOUS PHASE

The present invention relates to dispensing, issuing, and diffusing any liquid phase substance in a volume in the form of a spray or a vapor or otherwise without spoiling or modifying its original properties and fragrance, thereby making it possible to accurately reproduce the original scent of a perfume, or the therapeutic, chemical and physical qualities of medicinal, hygienic, cosmetic or cleansing solutions. Diffusion may take place by natural or forced convection or it may be generated by a predetermined source of heat which is self-regulated as a function of the boiling point of the volatile components to be evaporated.

More specifically the present invention relates to a method and a diffuser for use with liquids and in particular perfumes, insecticides, medicines, cosmetics, water, etc. In one application of the invention, means are provided for bringing the liquid to be diffused into the vicinity of a hot zone which is heated, for example, by a regulated electrical resistance, with the liquid being vaporized in the zone, means can also be provided for projecting the liquid onto a surface from which it rebounds, which surface may optionally be a vibrating surface.

BACKGROUND OF THE INVENTION

Diffusers are known in which the liquid-conveying means are constituted by a rod or wick of porous material dipping into a flask containing the liquid to be diffused and raising it by capillary action. In other diffusers, the liquid-conveying means are constituted by a simple tube dipping into the liquid and operating by gravity or by pressure or by vacuum or by ventilated dropping.

These diffusers suffer from various drawbacks due to the fact that they are not capable of avoiding carbonization and overheating which would otherwise crack or oxidize the active principles of the liquid to be diffused. In addition, e.g. because the wick saturates, such diffusers are not capable of ensuring that the evacuation process takes place regularly at a constant speed, which is necessary to ensure that the fragrant properties of the original liquid are maintained at the desired level.

Other diffusers make use of propellant gases of the fluorohydrocarbon type, for example. Such systems are controversial by virtue of fears about their effect on the environment. A good indication of current concerns is given by diffusers that use a piston pump controlled by an excentric driven by an electric motor (U.S. Pat. No. 4,189,098). These devices are expensive and inadequate for replacing the use of dissolved propellant gases.

SUMMARY OF THE INVENTION

The invention thus seeks to provide a method for diffusing and a diffuser of the type mentioned above in which the above-mentioned drawbacks are avoided while nevertheless obtaining higher quality spraying than is currently obtained using aerosols.

The invention also seeks to provide an exclusive or protective system personalized by encoding/decoding means that may be mechanical, electronic, or both, together with a speech-synthesizing audio-electronic system.

According to a characteristic of the present invention, the volatile liquid is expelled through a nozzle by a pump operating at a very high pressure or speed so as to obtain particles at the outlet from the nozzle having a size of not more than 45 microns ($\mu$). The invention is more particularly applicable to pumps of the manually-actuated type (generally by using a finger) and having a chamber volume of 5 microliters ($\mu$l) to 100 $\mu$l. In order to obtain such spraying, the injection actuation of such a pump must last for about 1 millisecond (ms) to 10 ms. The pump is preferably a precompression pump, e.g. of the type described in French patents numbers 2 305 241 or 2 403 465. The use of an ordinary aerosol with a propellant gas in a can of liquid (whether the gas is dissolved or not) does not make it possible to obtain a spray as fine as that which is obtained from the pump as in the instant invention operating at high pressure. In an aerosol, the motion of the valve rod serves only to open the valve. The liquid is expelled solely by the pressure of the propellant gas, which is independent of the speed of actuation. According to the present invention, the size of the diffused particles may be further reduced by causing them to ricochet against a smooth surface which is maintained at an appropriate temperature and which may optionally be a vibrating surface. An ultrasonic transducer is provided having a very high resonant frequency ($\geqq$1700 kHz) in order to provide good directivity and a good range for the particles of liquid expelled at very high pressure and speed in the form of a spray, said particles being very small in size, i.e. not greater than 45 $\mu$. After rebounding from the transducer, the particles are fragmented to between 0.1$\mu$ and 10$\mu$ by the piezoelectric vibration of the transducer which is more effective for drops of higher concentration. It is observed that particles of this size (<2.5$\mu$) remain in suspension in the air whereas larger particles precipitate. The smaller the particles, the quicker the vaporization.

Advantageously, the wall of the surface is smooth in order to avoid particles attaching themselves thereto and in order to enhance particle break-up, in particular under the effect of heat.

In this type of application, the surface is heated as a function of both ambient temperature and of the temperature of the liquid being vaporized so as to maintain the temperature at the outlet of the diffuser substantially constant at a value above the surface evaporation temperature of the component to be evaporated.

The back scattering surface may be confined inside a chamber.

Advantageously, the edges of the chamber wall have hems. The surface may thus be convex, e.g. spherical.

By virtue of these means, the diffuser of the invention ensures a constant speed of vaporization which always takes place at a temperature which is predetermined as a function of the boiling point of the volatile components, thereby avoiding volatile components being cracked or oxidized.

In a particularly advantageous embodiment, the heater means are constituted by an electrical resistance and its control means are associated in the form of a switching thermistor having a positive temperature coefficient on direct heating, referred to as a CTP thermistor, i.e. a temperature sensitive resistor constituted by a semiconductor and having a resistance which increases suddenly when its temperature rises to a specific value.

The use of positive temperature coefficient (CTP) ceramics for temperature detection, switching, and current stabilization is well known. What is less well known is their ability to operate as heater elements. In this application they have the advantages of heating up quickly, of being self-regulating, and of not requiring a thermostat or a control circuit as do corresponding heaters using conventional resistances.

In addition, they are equally applicable to AC circuits and to DC circuits, they have no moving parts, and they produce no radiofrequency interference (RFI). They are intrinsically protected against overheating and their temperature stability over long periods of time is excellent.

Metallized CTP ceramics are provided in the form of sealed components in insulating tubes. They are small, efficient, reliable, and cheap. Indeed, they constitute ideal devices for applications in which a quick rise in temperature is to be followed by moderate continuous heat dissipation.

With a conventional resistor, resistor control means may advantageously co-operate with a heater surface heated by the resistor and onto which means for conveying the substance to be diffused open out, e.g. a metal fractioning chamber placed at the outlet of the pump.

The control means may then comprise a thermocouple or a thermostat received in a hollow in the metal diffuser and connected to means for switching off the resistor heater.

In the preferred application using a CTP thermistor, the body of the thermistor is put into contact with the liquid leaving the spray nozzle. The thermistor then automatically performs its above-defined regulator function while simultaneously acting as a heater element, without there being any thermostat or control circuit.

According to another important characteristic of the invention, the spray pump is actuated by a plunger controlled by a solenoid acting directly or via a lever in the push or in the pull direction. Advantageously, when the solenoid has a yoke, permanent magnets act on the plunger bringing it close to a point of balance so that in order to actuate the plunger and thus the pump, the solenoid needs to exert only a relatively small force on the plunger, e.g. 10 or less percent or less of the force normally required to actuate the plunger (e.g. if a force of 2.3 kilograms (kg) is required, then the magnets are designed to provide 2.2 kg), consequently providing a saving in electrical energy of 40%. In order to enable the plunger to be unstuck under the force of a return spring which is nearly in equilibrium with the permanent magnets, the invention provides for a shock absorber of rubber or the like to be placed at the end of the core, thereby preventing it from sticking, absorbing the shock of the core in the solenoid, and causing it to bounce back. It is thus possible to actuate the pump very quickly. For example, a compression stroke may be obtained in less than 10 ms when using a pump of the type defined above. When using a solenoid without a yoke, the plunger may include permanent magnets and a magnetic mass such as soft iron. It may even include magnets and no magnetic mass. In a variant, instead of a solenoid system, it is possible to use a motor and step-down gear box arrangement which puts a powerful spring under tension progressively, with the spring being released powerfully and instantaneously by means of a cam of appropriate profile. When the apparatus is entirely manual, the pump may be operated by releasing a spring, with the spring being put under tension by manually rotating a cam having an appropriate profile and with the spring being released suddenly by a release mechanism. It is also possible to release a spring by rotating a magnet so as to invert its polarities relative to another magnet, thereby repelling the other magnet where previously it was attracted.

The actuator and heater device may be powered by primary batteries, rechargeable batteries, AC line voltage, or by any other means providing electrical energy.

The substance diffused by the pump may be accompanied or entrained by a flow of air, which air may optionally be heated.

In some applications, it is advantageous to diffuse a substance under special conditions, e.g. when at least one person is present in a room. The presence of a person may be detected by a radar system or a doppler effect sensor, which trips initiates operation of the device (infrared systems may also be used under certain circumstances, but at present they are less reliable in the presence of sunlight).

The operation of the device may be programmed by means of an electrically erasable programmable read only memory (EEPROM). The device may spray deodorant or perfume at certain times into underground subway passages. The device may constitute a peripheral system for use in with conjunction with publicity or promotional announcements or advertising. The device may respond to a gas detector, etc.

Since the device of the invention may provide spraying by means of a pump without an air intake, it is capable of operating in all positions and in all locations: on the ground, on the wall, on the ceiling, and even in a rarefied atmosphere. It is capable of delivering a medicine or a fragrance in full without burning or carbonizing the particles emitted.

The apparatus may be very small in size, e.g. about the same size as a packet of cigarettes.

Embodiments of the invention are shown by way of non-limiting example in the accompanying drawings, in which:

BRIEF DESCRIPTION OF THE DRAWINGS

FIG. 7 is a plan view of the outlet from said chamber;

FIG. 8 is a section view of a fractioning surface;

FIG. 10 is a diagram showing one technique for actuating the device of the invention;

FIG. 11 is a perspective view of a refill subassembly for a device of the invention;

FIGS. 12 and 13 are perspective views of two parts of one of the elements of the FIG. 11 subassembly.

DESCRIPTION OF THE EMBODIMENTS

Figure 1:
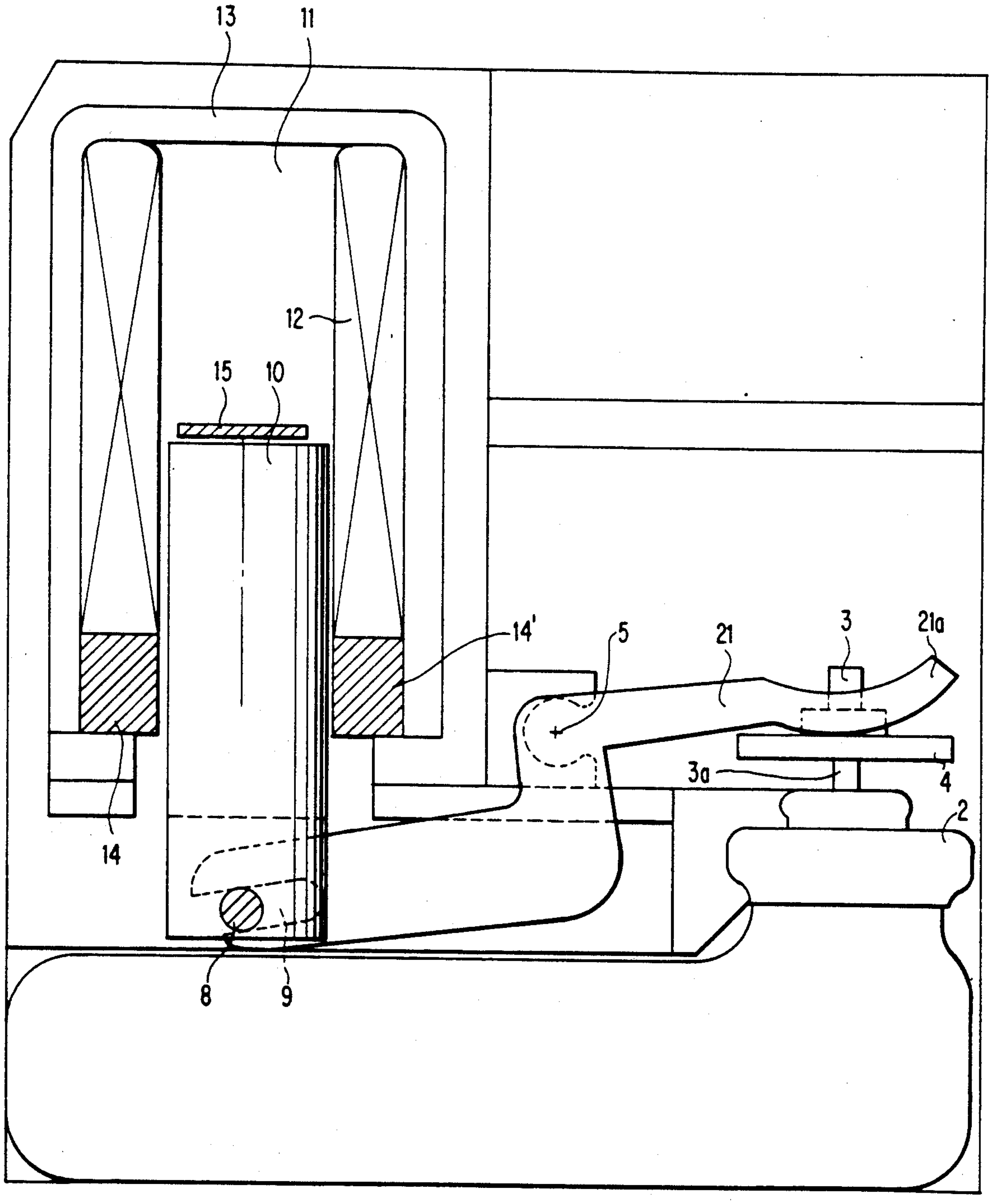
FIG. 1 is a diagrammatic elevation view, partially in section, of a device in accordance with the present invention.
Figure 15:
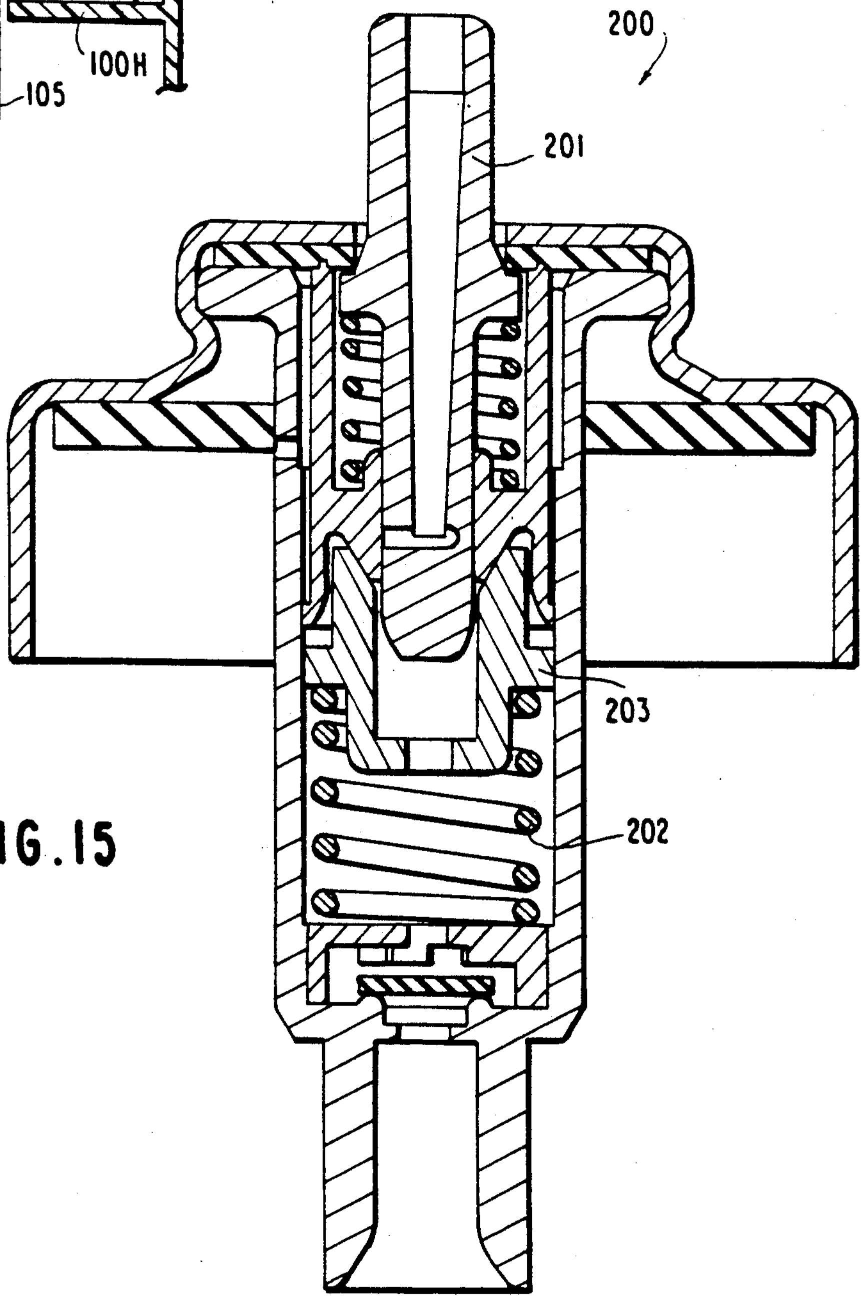
FIG. 15 is a schematic illustration of a conventional pump.

FIG. 1 shows a receptable 1 for containing a liquid for spreading through the air, e.g. to perfume a volume, to medicate an environment, to perform fumigation, to spray a cosmetic, etc. This receptable is fitted with a precompression pump 200, e.g. a pump of the type described in the above-mentioned French patents. This pump 200, as shown in FIG. 15, is crimped in the opening of the receptacle by a capsule 2 and is suitable for being actuated by depressing a piston 201 by means of a pushbutton 3 mounted on a rod 30 and which projects externally to enable such actuation to take place. In order to facilitate operation of the device, the pushbutton 3 is provided with a washer 4 which is fixed thereon. The pushbutton may be of the type described in French patent application number 89 05017, filed Apr. 14, 1989, for example. The pump 200 is thus actuated by depressing the washer 4 in order to cause the liquid to be expelled from the receptacle 1, with expulsion taking place only once the user has released the piston rod, the piston rod being raised again by an appropriately disposed return spring 202. It will be noted that return spring 202 supports and biases liquid delivery piston 203. In order to operate the pump 200, pressure is applied to the washer 4 by means of a lever 21 hinged at 5, with one end 21*a* of the lever having a rounded fork to bear against the washer 4. The other arm or end 21*b* of the lever 21 is connected to a magnetic plunger 10, e.g. by means of a pin 8 received in a slot formed in the plunger and engaged in a slot 9 formed in the end of the lever arm. The plunger moves in the cavity 11 of solenoid 12 whose yoke 13 may be rectangular or cylindrical.

At this stage, it can be seen how the device operates. By passing a current through the solenoid 12, the plunger 10 is raised, thereby rocking the lever and thus pushing down the piston rod 3*a* of the pump 200. A pulse of current through the solenoid thus causes one pump stroke to be performed, thereby emitting a spray. In the disposition shown, the spray is directed along the axis of the rod 3, i.e. along the axis of the pump 200. This is possible because the space lying on the axis of the pump 200 is empty, the pump 200 being actuated by a lever which is terminated by a fork. The spray outlet channel passes through the fork.

According to the invention, a pump stroke is quick and sudden, thereby avoiding a large drop forming as would normally happen and providing drops having a size of about 25 microns ($\mu$). At high pressure, some substances (such as alcohol) can be reduced to particles having a size of about 10$\mu$ to 20$\mu$.

Conventional, commercially-available precompression pumps emit doses constituting a fraction of a cubic centimeter. In order to obtain a good result with the present invention, such a pump must be actuated in a period of time which is not greater than 10 ms. This is possible only by using special mechanical actuating means. It is recalled that normal manual actuation takes place over about 150 ms. By having actuation take place in under 10 ms, very high pressure is developed in the outlet channel of the pump up to the spray nozzle, and under such conditions this pressure may reach 40 bars or more. Care is taken to use a spray nozzle capable of withstanding such pressure.

In order to obtain this result under advantageous conditions, when the solenoid is provided with a yoke 13, and permanent magnets 14 and 14′ are added to the solenoid with the effect of the permanent magnets being slightly less than the force required to actuate the pump. In general, manually-actuated pumps require finger thrust lying in the range 2 kg to 3 kg. For example, for a pump adjusted to operate at 2.2 kg, the effect of the magnets should lie in the range 2 kg to 2.1 kg. Tripping can then be very quick since it requires a force of only about 100 grams (g) to 200 g, and it can be obtained using means which are simple and compact, e.g. small-sized batteries (rechargeable or otherwise). A few watts of power are sufficient. In order to ensure that the core does not stick to the end of the solenoid and can be returned by the pump return spring, a shock absorber 15 is provided in accordance with the invention between the inside end of the core and the facing surface of the yoke, and may be fixed on either side of these two, preferably in the form of a star suitable for being developed over the conical plunger and made of silicone material or the like, and preferably capable of withstanding heat and having a Shore A hardness of 20+10 in order to attenuate the noise due to vibratory shock. The shock absorber may also be made of a metal braid.

In this embodiment, as in the following embodiments initiation or tripping may be obtained in a variety of ways: volume-scanning radar, pushbutton, suction by a patient, contact, infrared detection, photoelectric cell, magnetic detection, etc.

Figure 2:
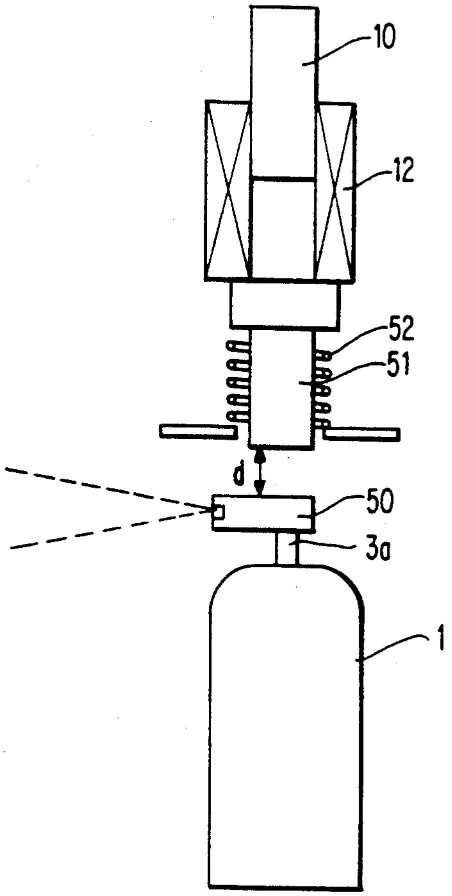
FIG. 2 is a section view through a variant in the rest position.

In the embodiment shown in FIG. 2, spraying takes place sideways relative to the pump 200 axis. The pump 200 is provided with a pushbutton 50 having a laterally directed spray nozzle. The actuator device is placed above the pump 200, i.e. on the axis of the piston actuator rod 39. This device essentially comprises a solenoid with a plunger 51 capable of moving inside the solenoid and acting directly on the pushbutton of the valve. The plunger 51 may be displaced between two positions: a rest position as shown in FIG. 2, and a position in which the magnetic mass 10 is lowered by the attraction exerted by the solenoid, in which position the plunger 51 pushes the pushbutton 50 to the end of its stroke. In an advantageous embodiment of the present invention, the plunger, when in its rest position, can be displaced from the pushbutton through a certain distance "d". This may be done by means of a spring 52. When the plunger is actuated by the solenoid, it travels the distance "d" before making contact with the pushbutton, and it therefore strikes it at a certain speed. The pushbutton is thus immediately driven with considerable initial speed and the pressure inside the pump 200 rises immediately and it rises to a higher value. This inertia effect may be reinforced by increasing the mass of the plunger or by choosing a plunger which is relatively heavy. With manual type pumps where the normal pump stroke is about 1 centimeter, the initial stroke "d" of the plunger may be of the same order of magnitude, or a little less: the range 5 mm to 10 mm gives good results. Fine spray may thus be obtained immediately from the beginning of spraying until the end of spraying.

The device of the invention as shown in FIG. 1 or in FIG. 2 may be actuated repetitively by applying pulses to the solenoid. One simple means consists in feeding rectified AC line current to the solenoid, e.g. by means of a diode. This provides a frequency of 50 strokes per second (or 60 in USA). The effect obtained is entirely similar to the effect of a valve emitting continuously since the rate of operation is too fast to be perceived due to the persistence of images on the retina.

If it is desired to perform spraying on a stroke-by-stroke basis taking power from AC lines, then a diode bridge should be used. This provides uninterrupted non-inverted current. Closing a contact causes the plunger to move once and it remains in the displaced position so long as the contact remains closed.

When using a DC power supply (batteries), a repetitive effect can be obtained by means of an appropriate circuit.

For use with substances that become fixed, agglomerated, stuck, or polymerized on contact with air (e.g. a lacquer), the arrival speed of the delivered liquid is extremely fast, thereby enabling pressure to open up the nozzle if it has become clogged. By virtue of the flow of ejected dose stopping suddenly, a vacuum phenomenon occurs in the nozzle and this tends to empty the duct of its liquid, thereby avoiding clogging.

In a variant, emission may be obtained by means of a spring which is put under tension by hand or by means of an electric motor and gearbox assembly. The spring is tripped by a cam follower escaping from a cam having an appropriate profile.

Figure 3:
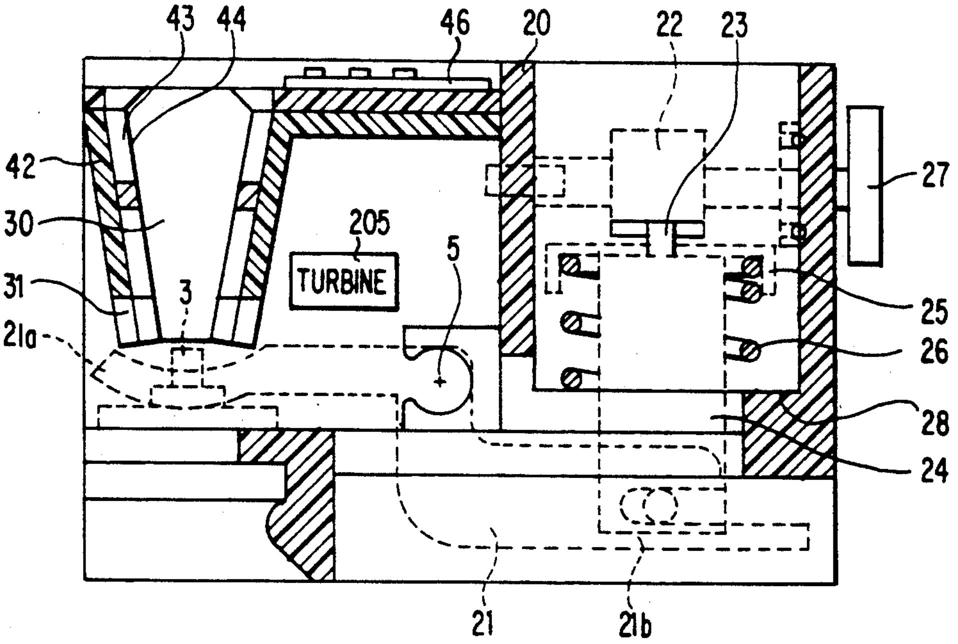
FIG. 3 is a section through another variant.
Figure 4:
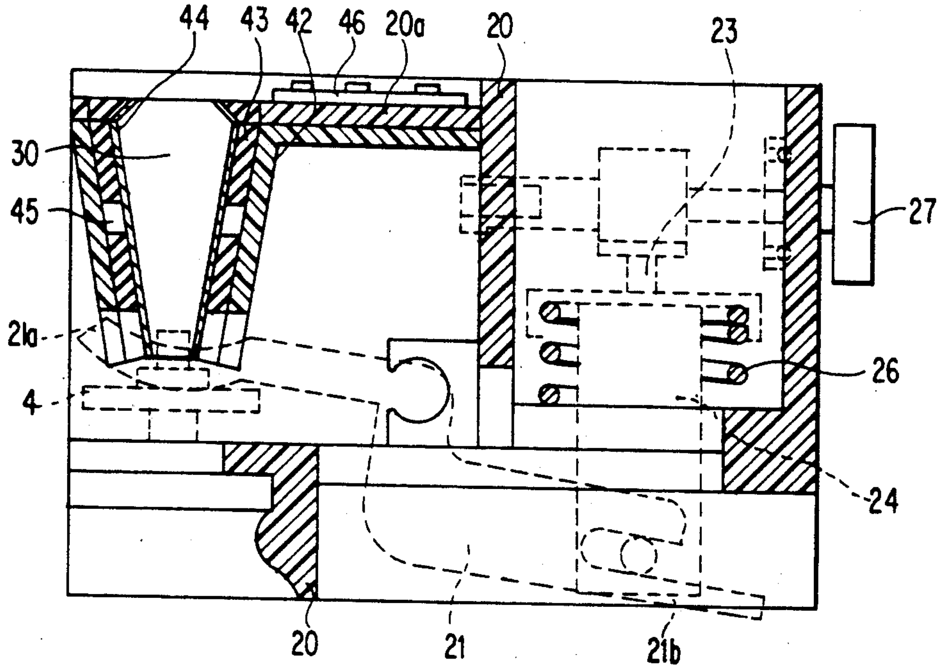
FIG. 4 is a view of the FIG. 3 variant immediately prior to emission.

In FIGS. 3 and 4, a support frame 20 (e.g. made of plastic material) serves to hold the various parts of the device together, and in particular: the trip mechanism; the flask of substance to be diffused; the hinge axis 5 of a lever; and said lever 21. In FIG. 3, the lever 21 is shown in the rest position after emitting a spray. The fork 21*a* at the lefthand end is down. A cam 22 bears against a cam follower 23 connected to an actuator rod 24 hinged to the righthand end 21*b* of the lever and to a plate 25 bearing against a spring 26 whose other end bears against a shoulder 28 of the support 20. When a button 27 is rotated, thereby driving the cam, the plate is pushed back, together with the arm 21*b* of the lever, thus reaching the position shown in FIG. 4. The piston rod 39 of the pump 200 is raised. The spring 26 is compressed. As soon as the cam follower 23 escapes from the cam profile, the spring expands suddenly and returns the lever to the position shown in FIG. 3. The lefthand arm has pressed energetically and rapidly against the washer 4 which moves down to inject a dose of substance. Spring operation makes it possible to actuate the pump 200 with the force and timing required by the present invention for obtaining a spray of the desired fineness. The button 27 may be rotated by hand, or by any other appropriate means, e.g. and electric motor and gearbox assembly. A turbine 205 may be driven simultaneously by the motor to blow a flow of air that entrains the spray. The flow of air may also be provided by a bellows (not shown) driven at the same time as the pushbutton 3 of the pump 200, thereby producing a two-phase effect: air plus liquid particles.

Figure 5:
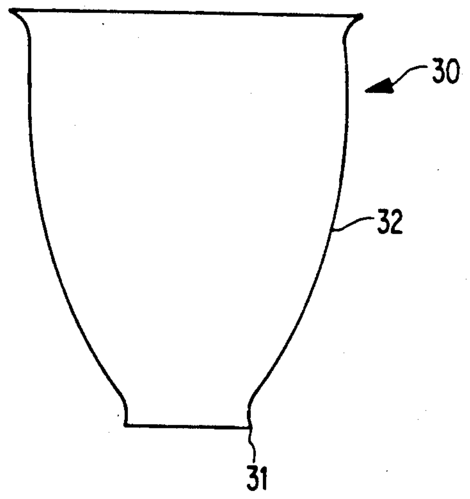
FIGS. 5 and 6 are section views on two perpendicular planes through a fractioning chamber of the invention.
Figure 6:
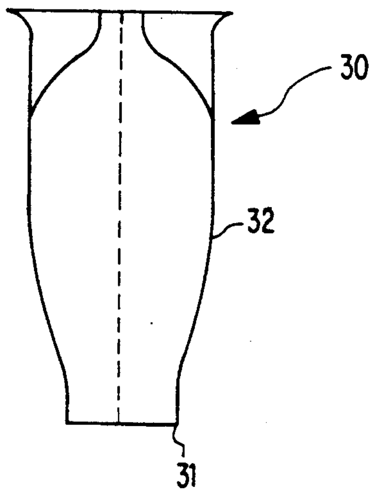

In accordance with another embodiment of the present invention, a fractioning chamber or surface 30 is placed at the outlet of the jet of spray from the pump. An example of such a chamber is shown in detail in FIGS. 5, 6, and 7. Another example is shown at the pump outlet in FIGS. 3 and 4. An example of a fractioning surface is shown in FIG. 8. The chamber of FIGS. 5 to 7 has a neck 31 which fits to the outlet of the pump 200, and has a wall 32 defining a volume, with the inside surface of the wall being polished, to have a surface state close to brilliant, the wall being made of a metal which is a good conductor, e.g. nickel-plated copper or polished anodized aluminum. The particles bounce and slide and provide instantaneous cold spray. It is necessary to prevent the particles from attaching to the wall since any prolonged period of time in a heated space could modify their chemical structure. The rim is provided with a hem to prevent the substance condensing at the outlet (even if hot). In order to oblige the particles to fraction, the outlet of the chamber does not face the jet. A simple embodiment is obtained by narrowing the outlet opening (FIG. 7) at 35 where the opening is situated on the axis of the jet.

In FIGS. 3 and 4, the chamber 30 is shown mounted at the outlet of the pump 200. It is fixed in an appropriate manner on the support 20, e.g. by an arm or tongue 20*a*. The narrow bottom portion 31 may be split to pass the fork of the actuator lever.

The wall of the chamber may advantageously have three layers: a shape 42, e.g. made of plastic material, lined on the inside with an insulating layer 43 with the inside of the insulating layer being provided with a metal foil 44 which is a good conductor both of heat and of electricity, e.g. a foil of aluminum or of nickel-plated copper.

One or more resistors 45, e.g. CTP resistors, may be embedded in the insulation on the outside face of the metal foil. When using CTP resistors, flat-shaped CTP resistors may be provided between two faces or by means of two strips on a single face.

An electronic circuit card 46 receives various components, e.g. a light emitting diode (LED), a microprocessor, a timer, a trip button, a circuit for detecting the state of the batteries, an aspiration or odor detection circuit, a photoelectric cell, an antenna, an ultrasonic detector, an infrared detector, a speech synthesizer, etc.

Depending on diffusion requirements, such a chamber may be used or omitted. In the absence of such a chamber, when the pump sprays directly into the atmosphere, a spray nozzle is selected which is appropriate for the requirement and for the substance being sprayed. When using a fractioning chamber, it is advantageous for the particles to strike the walls of the chamber, and a spray nozzle is selected so as to provide a spray whose particles are as fine as possible.

FIG. 8 is a sectional view showing a hemispherical rebound surface 55. The spray is directed towards the pole of the hemisphere. A heater resistor 56, e.g. a CTP resistor, is provided inside the hemisphere against its pole, with the resistor being powered via a spring 57 and a connection 58 to the hemisphere, for example. The inside of the hemisphere is filled with an insulating material. Such a surface may be fixed facing the spray orifice and it spreads the spray all around e.g. to diffuse a perfume or a cleansing substance. The impact surface may be constituted by a ceramic which is vibrated by means of a piezoelectric ultrasonic transducer.

FIG. 10 is a diagram of different mechanical means for tripping the device. A south-north magnet 87 is placed between two north-south magnets 86 and 88, with the magnet 86 being rotatable. Initially, the magnet 87 is attracted at both ends and is therefore in (unstable) equilibrium, and by rotating the magnet 86 the magnet 87 is repelled while the magnet 88 attracts it. This principle can be used to obtain action which is very quick on a stroke-by-stroke basis.

The pump preferably does not have an air intake and is fixed to a pocket which collapses progressively as the liquid it contains is expelled.

Whether or not the diffuser includes a turbine, it may be powered from low voltage batteries. Alternatively it may be powered by AC, optionally after rectification.

Figure 9:
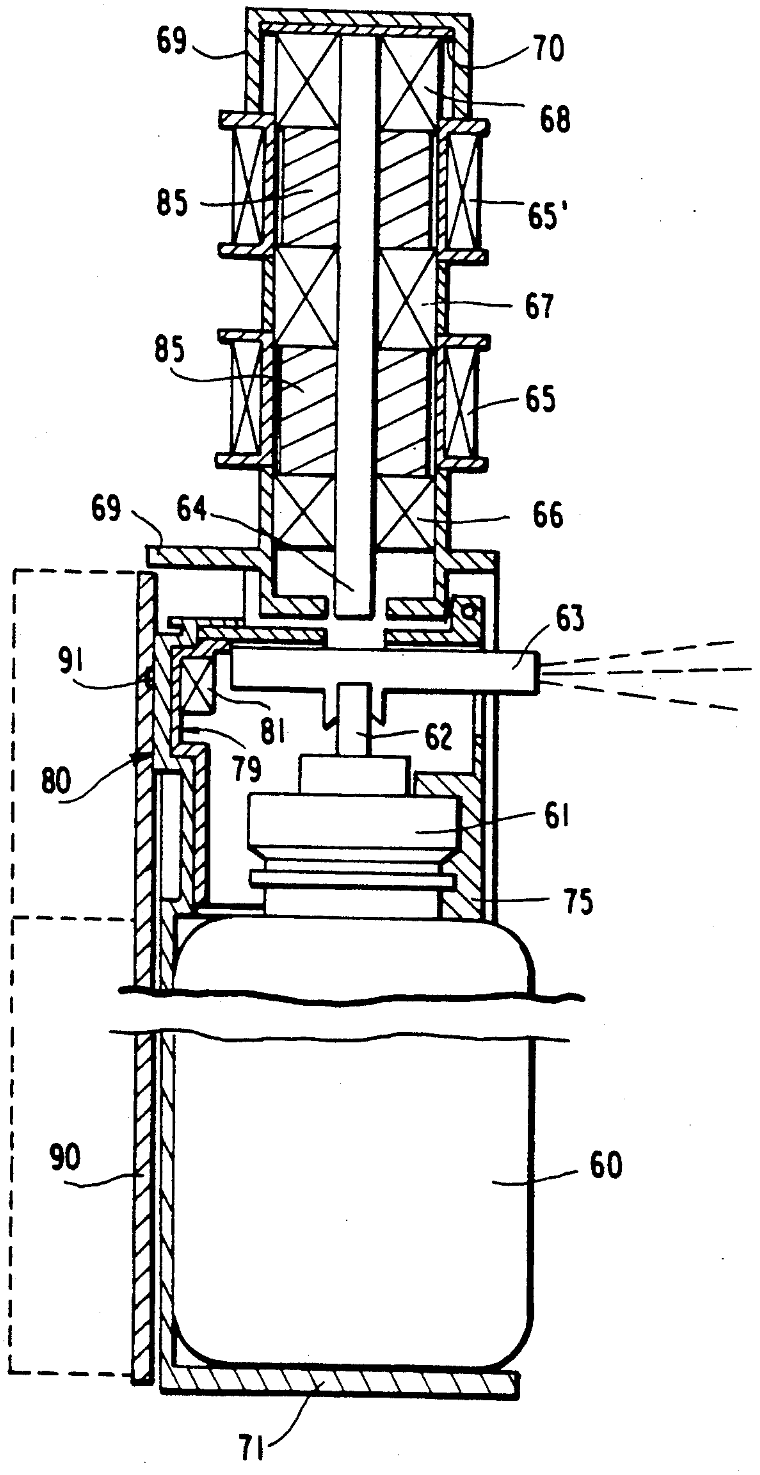
FIG. 9 is a view partially in section and partially in elevation of an embodiment of the device of the invention.

FIG. 9 shows a particular application of the invention. The device shown is intended to spray a liquid on a pseudo-continuous basis. It is intended to replace a spray normally provided by a propellant gas and it uses a pump 200 without any propellant gas, the pump 200 being actuated by device of the invention.

A receptacle 60 containing a liquid to be sprayed, e.g. hair lacquer, a hydrating solution for the skin, etc., is provided with a pump 200 which is crimped onto the receptacle by means of a capsule 61. The outlet tube 62 from the pump also serves as the pump actuator rod. A pushbutton 63 having a lateral outlet is fixed on the tube, with the outlet to the right in the figure. The pump 200 is actuated repetitively by a plunger 64 whose movement is controlled by a solenoid constituted by two windings 65 and 65'. The plunger rod 64 may advantageously be made of plastic material. Its shock and thrust against the pushbutton 63 are thus made silent. In order to be actuated by the windings 65, the plunger 64 is provided with three permanent magnets 66, 67, and 68. The windings 65 and 65' are oppositely directed, such that when they receive a current pulse, the winding 65' repels the magnet 67 while the winding 65 attracts it. The polarities of the magnets 66 and 68 are fixed so as to obtain thrust in the same direction. The plunger may also include inertia masses 85, e.g. made of plastic, copper, aluminum, etc. . . . . The assembly is fixed in a housing 69 whose top end is provided with a magnetic plate 70. The purpose of the plate is to hold the plunger in the high position by attraction from the magnet 68. The plate may also serve simultaneously as a shock absorber. In this case it may be constituted by a washer of corrugated metal (trade mark "Onduflex"), or by a washer of compressed metal cloth. The cloth embodiment has the advantage of being silent. As a result, when the solenoid is not excited, the magnet 68 is held against the plate 70. After a current pulse, the plunger strikes and pushes down the pushbutton 63, and when the pulse comes to an end, the plunger is returned by the return spring 202 of the pump 200 so as to bear against the plate 70. Even at speeds of 50 Hz or 60 Hz, the system is silent. The plunger is controlled by an electronic circuit (not described in detail) which is mounted on the support 90.

Figure 14:
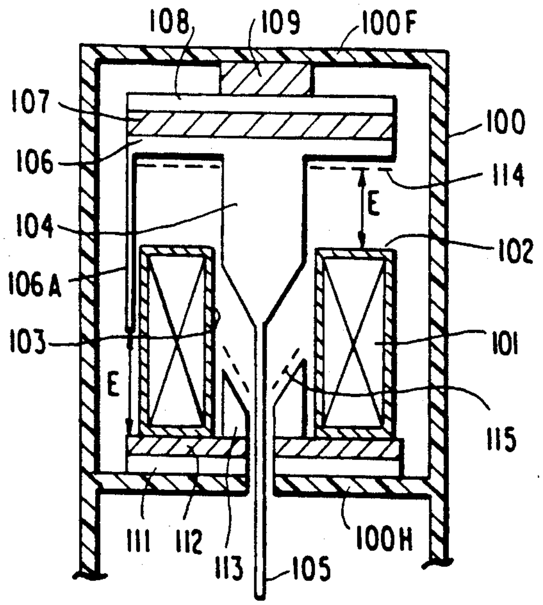
FIG. 14 is a variant embodiment of the actuator system for the device of FIG. 9.

FIG. 14 is a section view through a variant of the actuator system of the device of FIG. 9. It includes a housing 100 made of plastic for example, and it is extended by the housing enclosing the receptacle 60 in FIG. 9. This housing 100 contains a solenoid 101 constituted by a wire wound on a former 102 having a hub 103 which guides the plunger. The plunger includes a core 104 of soft iron extended by a rod 105 of non-magnetic material (stainless steel or brass). The end of the rod strikes the pusher 63 of the device shown in FIG. 9. In order to increase the energy of this tripping system, the core is formed with a washer 106 at its end opposite to the rod. The washer 106 is at a distance E from the former 102 which distance represents the stroke of the plunger. On the left half of the figure, the washer is shown with a peripheral skirt 106A which surrounds a portion of the former 102, thereby recovering solenoid flux and obtaining an energy saving of up to 25% in addition to the saving obtained by having magnets present. In its rest position, the edge of the skirt is at a distance from the magnet 112 of not less than the plunger stroke E. A flat magnet 107 is placed against the washer 106 as is a soft iron slab 108, both having the same shape as the washer. If AC is used, then the magnet 107 is omitted. The end 100F of the housing has a small magnet 109 fixed thereto for the purpose of retaining the plunger in its high or rest position. In order to increase the attractive force on the plunger after it has been unstuck from the magnet 109, a soft iron washer 111, a washer-shaped magnet 112, and a magnet 113 having an axial hole are all provided against the wall 100H of the housing 100. The rod 105 of the plunger passes through the soft iron washer 111 and through both of the magnets 112 and 113. In order to improve the magnetic flux between the plunger 104 and the magnet 113, in particular at the end of a stroke bringing them close to each other, the limiting surfaces of the plunger and magnet 113 may comprise complementary conical surfaces. The various means shown may be used together with one another, or only some of them may be used.

On order to damp the end of the plunger stroke, a rubber washer 114 may be provided against the washer 106, the rubber washer preferably having a hardness of 20+ on the Shore A scale, as mentioned above.

In a variant, the damping shock absorber may be placed against the magnet 113 and, where appropriate it may have the same conical shape as the mating surfaces of the magnet 113 and the plunger 104. If the shock absorber 115 is placed at this location, then it is advantageously made of magnetic material in order to reduce the non-magnetic gap, e.g. of compressed or molded metal sheet, or else it may be constituted by a corrugated metal washer.

The operation of the system is simple: when a current wave flows through the solenoid, the core is attracted downwards initially under the electromagnetic effect and subsequently under the effect of attraction from the magnets 112 and 113 as the core moves close to them. The end of the rod 105 strikes the pusher 63 and then pushes it down.

The fineness of spraying is a function of the speed with which the the pusher is pushed down. Repetitive actuation of the solenoid provides quasi continuous spraying, if it takes place at a sufficient rate. A rate of 50 strokes per second as provided by AC lines gives an excellent result.

As can be seen from the description given with reference to FIG. 9, the device comprises a receptacle 60 with a pump 61 actuated by a rod 62 fitted with a pushbutton 63, and a repetitive actuator system constituted by the plunger 64 and the solenoid 65 mounted in the housing 69, 71. The actuator system must be adapted to the substance to be sprayed. Such substances are numerous and they have very different properties. Expulsion rates and pump strokes are different. When the receptacle 60 is empty, it needs replacing but the actuator system is often reusable, with a single actuator system being capable of operating with one or more hundreds of receptacles which are then considered as constituting refills. (The invention could also be used with cheap actuator systems intended to be discarded together with the receptacle when the receptacle is empty.) In order to avoid fitting an actuator system to a refill which is not appropriate therefor, the invention provides a keying system described with reference to FIGS. 11, 12, and 13.

In a particular application of the present invention, the actuator system includes a housing 71 in which a refill 60 is to be received together with its pump 200 and its pushbutton 63. In order to prevent customers making mistakes, the vendor of the refill provides it with a box 72 which is generally in the form of a cube surrounding the head or projecting portion of the pump 200 and its fixing capsule on the neck of the receptacle. This box 72 comprises a box 73 (FIG. 12) constituted by five sides of a cube, and a lid 74 (FIG. 13). The box 73 thus has one open face, and another face having a slot 75 suitable for being engaged on the head of the pump 200. Once the box has been engaged on the head of the pump 200, the lid 76 is put into place definitively by ultrasonic welding, gluing, snap fastening, etc., in order to close the open face of the box and prevent the box being removed from the refill. The box has an orifice 76 in one of its faces enabling the plunger to push down the pushbutton, and it has another orifice 77 through which the end of the pushbutton and its nozzle pass. The assembly then appears as shown in FIG. 11. It is then possible, by means of this box, to provide corresponding means in the housing 71 that prevent mistakes when replacing the refill.

The refill is received in the housing 71. At least one of the faces of the box 72 may be fitted with one or more ribs 78 co-operating with corresponding grooves formed in the housing. If a rib has the wrong width or is in the wrong location, then the refill cannot be pushed home in the housing. Where a user could remove a rib, faces of the box that bear against walls of the housing may be provided with appropriate projections 79 (see FIGS. 9 and 13) co-operating with corresponding hollows 80 formed in the walls of the housing. If the parts in relief do not correspond, then the refill cannot be pushed fully home and the plunger will not face the hole 76. The system will be incapable of operating. In addition, magnetic elements 81, 82 may be provided in the wall of the box and operation of the apparatus may be enables or inhibited by detecting these elements coming level with electronic Hall effect components 91 responsive to magnets and placed in appropriate locations inside the housing 71.

To this end, the housing 71 is fitted with appropriate electronics, with members sensitive to the presence of the magnets 81 and 82 in locations corresponding to proper use of the device. The electronics may also include a loudspeaker system for emitting sound signals, e.g. by speech synthesis in order to announce that a refill needs changing, that the assembly is wrong (the magnetic elements do not match), to make advertising announcements, or to verify dosage of a medicine.

I claim:

1. A method of dispensing, issuing, or diffusing a liquid from a dispenser which expels liquid through a nozzle of a spray pump which has a liquid delivery piston, the method comprising the steps of:

- providing the pump, said pump being fluidly coupled to the liquid to be sprayed;
- providing a mechanical means for actuating the pump so as to expel the liquid, said mechanical means comprising a plunger controlled by a solenoid, wherein said plunger is adapted to contact the pump and is disposed a predetermined distance d away from the pump, said predetermined distance d being in the range of about 0.5 to 1.0 times the stroke of the pump; and
- actuating said mechanical means so as to permit said mechanical means to accelerate through said predetermined distance d prior to engaging and actuating the pump thereby producing a spray in which the particles of fractionated liquid are not greater than about 45 microns in diameter, depending on the surface tension of the expelled liquid, so as to substantially simulate the fine spraying characteristics achieved by an aerosol.

2. A method according to claim 1, wherein the pump has a volume which lies in the range of about 5 microliters to about 100 microliters, and wherein said actuating step comprises actuating said mechanical means so as to cause expulsion of the liquid in a period of time no greater than 10 milliseconds.

3. A method according to claim 2, further comprising the step of directing said spray towards a smooth surface in order to cause the particles to be fractionated by impact against said smooth surface, thereby obtaining particles of said fractionated liquid having a diameter no greater than about 1 micron, said smooth surface being heated to a predetermined temperature above the vaporization temperature of the liquid.

4. A method according to claim 3, wherein said smooth surface is a ceramic material, and wherein said method further comprises the steps of:

- providing a vibrating means for vibrating said smooth surface, said vibrating means comprising a piezoelectric ultrasonic transducer; and
- vibrating said smooth surface.

5. The method according to claim 1, wherein said actuating step comprises repetitively actuating said mechanical means at a fast rate so as to produce pseudo-continuous operation.

6. A diffuser having a spray pump, said spray pump including a liquid delivery piston and having a volume lying in the range of about 5 microliters to 100 microliters, a pump activating pushbutton (4, 50) for transmitting a force to the liquid delivery piston of the pump when thrust is applied thereon, a return spring returning the liquid delivery piston towards a rest position, and an outlet spray nozzle for fractionating a liquid by the pressure effect, said diffuser comprising:

- the pump;
- mechanical actuator means (10, 12-22, 26) comprising a plunger controlled by a solenoid, said plunger being disposed a predetermined distance d from the pump for applying thrust on the pump activating pushbutton for a period of time shorter than about 10 milliseconds; wherein
- said predetermined distance d is in the range of about 0.5 to 1.0 times the stroke of the pump; and wherein
- said plunger accelerates from a rest state through said predetermined distance d prior to striking said pump activating pushbutton wherein said pump thereby produces a spray in which the particles of fractioned liquid are not greater than about 45 microns in diameter, depending on the surface tension of the expelled liquid, so as to substantially simulate the fine spraying characteristics achieved by an aerosol.

7. A diffuser according to claim 6, further comprising repetitive control means for repetitively operating said mechanical actuator means at a fast rate so as to produce pseudo-continuous operation.

8. A diffuser according to claim 6 or 1, further comprising control means for controlling said mechanical actuator means on a stroke-by-stroke basis.

9. A diffuser according to claim 6, further comprising:

a housing for fixedly supporting said mechanical actuator means and for receiving a receptacle fixedly connected to the pump; and keying means comprising a first relief portion (79, 80) disposed surrounding the pump and operatively coupled to said receptacle and a second relief portion located within said housing for ensuring that only appropriate receptacles having complementary ones of said first and second relief portions can be admitted into said housing.

10. A diffuser according to claim 6, further comprising electronic means for emitting sound signals, wherein said sound signals comprise synthesized voice messages.

11. A diffuser according to claim 6, further comprising a shock absorber (15, 114, 115) for dampening the motion of said plunger, said shock absorber comprising a material selected from a group consisting of rubber, compressed metal cloth and corrugated metal.

12. A diffuser having a spray pump, said spray pump including a liquid delivery piston and having a volume lying in the range of about 5 microliters to 100 microliters, a pump activating pushbutton (4, 50) for transmitting a force to the liquid delivery piston of the pump when said force is applied thereon, a return spring returning the liquid delivery piston towards a rest position, and an outlet spray nozzle for fractionating a liquid by the pressure effect, said diffuser comprising:

the pump;

mechanical actuator means (10, 12–22, 26) disposed a predetermined distance d from the pump for applying said force on the pump activating pushbutton for a period of time shorter than about 10 milliseconds;

wherein said predetermined distance d is in the range of about 0.5 to 1.0 times the stroke of the pump;

wherein said mechanical actuator means accelerates from a rest state through said predetermined distance d prior to striking said pump activating pushbutton;

wherein said mechanical actuator means for the pump is a plunger (10) controlled by a solenoid; and wherein said mechanical actuator means includes at least two magnets (86, 87) whose relative positions give rise to mutual attraction or repulsion.

13. A diffuser having a spray pump, said spray pump including a liquid delivery piston and having a volume lying in the range of about 5 microliters to 100 microliters, a pump activating pushbutton (4, 50) for transmitting a force to the liquid delivery piston, of the pump when said force is applied thereon, a return spring returning the liquid delivery piston towards a rest position, and an outlet spray nozzle for fractionating a liquid by the pressure effect, said diffuser comprising:

the pump;

mechanical actuator means (10, 12–22, 26) disposed a predetermined distance d from the pump for applying said force on the pump activating pushbutton for a period of time shorter than about 10 milliseconds;

wherein said predetermined distance d is in the range of about 0.5 to 1.0 times the stroke of the pump; and wherein said mechanical actuator means accelerated from a rest state through said predetermined distance d prior to striking said pump activating pushbutton;

wherein said mechanical actuator means for the pump is a plunger (10) controlled by a solenoid and said mechanical actuator means further comprises a plurality of permanent magnets (14) magnetically coupled to said plunger, said permanent magnets providing an attractive force to said plunger (10) which is less than or equal to a spring force provided by the return spring of the pump.

14. A diffuser according to claim 6, 12, or 13, further comprising:

a smooth surface for fractionating the liquid; and heating means (32, 44, 45) for heating said smooth surface to a constant temperature.

15. A diffuser according to claim 6, 12 or 13, further comprising means for establishing a flow of air around and inside the spray and in the same direction as the spray.

16. A diffuser according to claim 14, wherein said heater means is servo-controlled to provide a temperature at a value above the vaporization temperature of said liquid.

17. A diffuser according to claim 14, further comprising means for establishing a flow of air around and inside the spray and in the same direction as the spray.

18. A diffuser according to claim 17, wherein said heater means is servo-controlled to provide a temperature at a value above the vaporization temperature of said liquid.

19. A diffuser having a spray pump, said spray pump including a liquid delivery piston and having a volume lying in the range of about 5 microliters to 100 microliters, a pump activating pushbutton (4, 50) for transmitting a force to the liquid delivery piston of the pump when said force is applied thereon, a return spring returning the liquid delivery piston towards a rest position, and an outlet spray nozzle for fractionating a liquid by the pressure effect, said diffuser comprising:

the pump;

mechanical actuator means (10, 22–22, 26) disposed a predetermined distance d from the pump for applying said force on the pump activating pushbutton for a period of time shorter than about 10 milliseconds;

wherein said predetermined distance d is in the range of about 0.5 to 1.0 times the stroke of the pump;

wherein said mechanical actuator means accelerates from a rest state through said predetermined distance d prior to striking said pump activating pushbutton;

wherein said mechanical actuator means for the pump is a plunger (10) controlled by a solenoid and said mechanical actuator means; and wherein said plunger includes a rod (64) of a non-magnetic material fixedly coupled to at least one of a plurality of magnets (66, 67, 68) and a plurality of inertia masses (85) of non-magnetic material.

20. A diffuser having a spray pump, said spray pump including a liquid delivery piston and having a volume lying in the range of about 5 microliters to 100 microliters, a pump activating pushbutton (4, 50) for transmitting a force to the liquid delivery piston of the pump when said force is applied thereon, a return spring returning the liquid delivery piston towards a rest position, and an outlet spray nozzle for fractionating a liquid by the pressure effect, said diffuser comprising:

the pump;

mechanical actuator means (10, 12–22, 26) disposed a predetermined distance d from the pump for applying said force on the pump activating pushbutton for a period of time shorter than about 10 milliseconds;

a housing for fixedly supporting said mechanical actuator means and for receiving a receptacle fixedly connected to the pump; and keying means comprising a first relief portion (79, 80) disposed surrounding the pump and operatively coupled to said receptacle and a second relief portion located within said housing for ensuring that only appropriate receptacles having complementary ones of said first and second relief portions can be admitted into said housing;

wherein said predetermined distance d is in the range of about 0.5 to 1.0 times the stroke of the pump;

wherein said mechanical actuator means accelerates from a rest state through said predetermined distance d prior to striking said pump activating pushbutton;

wherein said mechanical actuator means for the pump is a plunger (10) controlled by a solenoid and said mechanical actuator means; and wherein said keying means further comprises electronic keying means for ensuring that only a selected said receptacle is admitted to said housing, said electronic means comprising at least one magnet and at least one magnet sensor disposed so as to oppose one another when said selected receptacle is located in said housing.

21. The diffuser having a spray pump, said spray pump including a liquid delivery piston and having a volume lying in the range of about 5 microliters to 100 microliters, a pump activating pushbutton (4, 50) for transmitting a force to the liquid delivery piston of the pump when said force is applied thereon, a return spring returning the liquid delivery piston towards a rest position, and an outlet spray nozzle for fractionating a liquid by the pressure effect, said diffuser comprising:

the pump;

mechanical actuator means (10, 12–22, 26) disposed a predetermined distance d from the pump for applying said force on the pump activating pushbutton for a period of time shorter than about 10 milliseconds;

wherein said predetermined distance d is in the range of about 0.5 to 1.0 times the stroke of the pump;

wherein said mechanical actuator means accelerates from a rest state through said predetermined distance d prior to striking said pump activating pushbotton;

wherein said mechanical actuator means for the pump is a plunger (10) controlled by a solenoid and said mechanical actuator means; and wherein said plunger includes a core of a magnetic material extending between a rod of a non-magnetic material and a washer of said magnetic material.

22. The diffuser according to claim 21, wherein said magnetic material is soft iron.

23. A diffuser having a spray pump, said spray pump including a liquid delivery piston and having a volume lying in the range of about 5 microliters to 100 microliters, a pump activating pushbutton for transmitting force to the liquid delivery piston of the pump when thrust is applied thereon, a return spring returning the liquid delivery piston towards a rest position, and an outlet spray nozzle for fractionating a liquid by the pressure effect, said diffuser comprising:

the pump;

mechanical actuator means disposed a predetermined distance d from the pump for applying thrust on the pump activating pushbutton for a period of time shorter than about 10 milliseconds; wherein said mechanical actuator means for the pump is a plunger controlled by a solenoid;

said mechanical actuator means includes at least two magnets whose relative positions give rise to mutual attraction or repulsion;

said predetermined distance d is in the range of about 0.5 to 1.0 times the stroke of the pump; and wherein said mechanical actuator means accelerates from a rest state through said predetermined distance d prior to striking said pump activating pushbutton.

24. A diffuser having a spray pump, said spray pump including a liquid delivery piston and having a volume lying in the range of about 5 microliters to 100 microliters, a pump activating pushbutton for transmitting force to the liquid delivery piston of the pump when thrust is applied thereon, a return spring returning the liquid delivery piston towards a rest position, and an outlet spray nozzle for fractionating a liquid by the pressure effect, said diffuser comprising:

the pump;

mechanical actuator means disposed a predetermined distance d from the pump for applying thrust on the pump activating pushbutton for a period of time shorter than about 10 milliseconds; and a plurality of permanent magnets magnetically coupled to said plunger, said permanent magnets providing an attractive force to said plunger which is less than or equal to a spring force provided by the return spring of the pump; wherein said mechanical actuator means for the pump is a plunger controlled by a solenoid;

said predetermined distance d is in the range of about 0.5 to 1.0 times the stroke of the pump; and wherein said mechanical actuator means accelerates from a rest state through said predetermined distance d prior to striking said pump activating pushbutton.

25. A diffuser having a spray pump, said spray pump including a liquid delivery piston and having a volume lying in the range of about 5 microliters to 100 microliters, a pump activating pushbutton for transmitting force to the liquid delivery piston of the pump when thrust is applied thereon, a return spring returning the liquid delivery piston towards a rest position, and an outlet spray nozzle for fractionating a liquid by the pressure effect, said diffuser comprising:

the pump;

mechanical actuator means disposed a predetermined distance d from the pump for applying thrust on the pump activating pushbutton for a period of time shorter than about 10 milliseconds; wherein said mechanical actuator means for the pump is a plunger controlled by a solenoid;

said predetermined distance d is in the range of about 0.5 to 1.0 times the stroke of the pump; and wherein said plunger includes a rod of a non-magnetic material fixedly coupled to at least one of a plurality of magnets and a plurality of inertia masses of non-magnetic material; and said mechanical actuator means accelerates from a rest state through said predetermined distance d prior to striking said pump activating pushbutton.

26. A method of dispensing, issuing, or diffusing a liquid from a dispenser which expels liquid through a nozzle of a spray pump under internal pressure, the method comprising the steps of:

providing the pump, said pump being fluidly coupled to the liquid to be sprayed;

providing a mechanical means for actuating the pump so as to expel the liquid, wherein a portion of said mechanical means adapted to contact the pump is disposed a predetermined distance d away from the pump, said predetermined distance d being in the range of about 0.5 to 1.0 times the stroke of the pump;

actuating said mechanical means so as to permit said mechanical means to accelerate through said predetermined distance d prior to actuating the pump thereby producing a force delivered to said pump so as to provide a liquid spray in which the particles of fractionated liquid are not greater than about 45 microns in diameter, depending on the surface tension of the expelled liquid; and directing said liquid spray towards a smooth surface heated to a temperature greater than the vaporization temperature of the liquid so as to convert said liquid spray to a gas.

27. A diffuser having a spray pump, said spray pump including a liquid delivery piston and having a volume lying in the range of about 5 microliters to 100 microliters, a pump activating pushbutton for transmitting a force to the liquid delivery piston of the pump when said force is applied thereon, and a return spring returning the liquid delivery piston towards a rest position, said diffuser comprising:

the pump;

mechanical actuator means disposed a predetermined distance d from the pump for applying said force on the pump activating pushbutton for a period of time shorter than about 10 milliseconds;

an outlet spray nozzle for fractionating a liquid by the pressure effect so as to produce a liquid spray having a particle size in a range of about 45 microns;

a smooth surface positioned across said liquid spray; and heating means for heating said smooth surface to a constant temperature greater than the vaporization temperature of the liquid; wherein said predetermined distance d is in the range of about 0.5 to 1.0 times the stroke of the pump; wherein said mechanical actuator means accelerates from a rest state through said predetermined distance d so as to generate said force prior to striking said pump activating pushbutton; whereby said smooth surface and said heating means are operable for converting said liquid spray to a gas.

* * * * *